(12) United States Patent
Shannon et al.

(10) Patent No.: US 11,337,144 B2
(45) Date of Patent: May 17, 2022

(54) MULTICOMPUTER SIGNAL PROCESSING TO DYNAMICALLY GENERATE CUSTOMIZED OUTPUT AND CONTROL FUNCTIONS

(71) Applicant: Bank of America Corporation, Charlotte, NC (US)

(72) Inventors: Stephen T. Shannon, Charlotte, NC (US); James Alexander, Dripping Springs, TX (US); Brian Joseph Smith, St. Augustine, FL (US)

(73) Assignee: Bank of America Corporation, Charlotte, NC (US)

( * ) Notice: Subject to any disclaimer, the term of this patent is extended or adjusted under 35 U.S.C. 154(b) by 120 days.

(21) Appl. No.: 16/533,045

(22) Filed: Aug. 6, 2019

(65) Prior Publication Data
US 2021/0045043 A1 Feb. 11, 2021

(51) Int. Cl.
*H04W 48/14* (2009.01)
*H04W 4/08* (2009.01)
*H04W 48/04* (2009.01)

(52) U.S. Cl.
CPC ............. *H04W 48/14* (2013.01); *H04W 4/08* (2013.01); *H04W 48/04* (2013.01)

(58) Field of Classification Search
None
See application file for complete search history.

(56) References Cited

U.S. PATENT DOCUMENTS

| | | | |
|---|---|---|---|
| 9,788,211 B2 | 10/2017 | Zhang | |
| 9,792,594 B1* | 10/2017 | Bayha | H04L 63/0861 |
| 9,961,624 B1 | 5/2018 | Zait | |
| 10,257,668 B2 | 4/2019 | Shaw et al. | |
| 2012/0160912 A1* | 6/2012 | Laracey | G06F 21/35 235/379 |
| 2014/0215505 A1* | 7/2014 | Balasubramanian | H04N 21/439 725/13 |
| 2017/0076306 A1* | 3/2017 | Snider | G06Q 30/0205 |
| 2018/0060843 A1* | 3/2018 | Maheshwari | G06Q 20/3224 |

* cited by examiner

*Primary Examiner* — Adnan Baig
(74) *Attorney, Agent, or Firm* — Banner & Witcoff, Ltd.

(57) ABSTRACT

Arrangements for dynamic customized experience generate and control are provided. In some examples, a signal emitted from a computing device may be detected. A location of the computing device may be determined or received. A user associated with the computing device may be identified and user data may be requested from one or more computing systems. The received location data and user data may be analyzed using machine learning to generate a user prediction. The user prediction may include a particular function, preferred method or requirements for authentication to another computing device, such as a self-service kiosk, a preferred layout or arrangement for data provided, and the like. Based on the generated user prediction, a customized user experience output may be generated and transmitted to a computing device (e.g., self-service kiosk, user computing device, or the like) for display to the user.

21 Claims, 14 Drawing Sheets

MULTICOMPUTER SIGNAL PROCESSING TO DYNAMICALLY GENERATE CUSTOMIZED OUTPUT AND CONTROL FUNCTIONS

BACKGROUND

Aspects of the disclosure relate to electrical computers, systems, and devices for executing real-time multicomputer signal processing. In particular, one or more aspects of the disclosure relate to real-time, dynamic customized experience generation and control functions.

Enhanced connectivity between communication devices, possible with advancing communication protocols, such as fifth generation (5G) cellular network technology, may be leveraged for providing improved customization of outputs for users. Real-time dynamic signal processing may be performed to generate user predictions which may then be used to generate and provide a customized user experience.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with providing real-time, customized outputs for a user.

In some examples, a system may continuously scan for signals emitted from one or more computing devices. Upon detecting a signal emitted from the computing device, a location of the computing device may be determined or received. A user associated with the computing device may be identified and user data may be requested from one or more computing systems. The one or more computing systems may be internal to an entity or external. The received location data and user data may be analyzed using machine learning to generate a user prediction. The user prediction may include a particular function, preferred method or requirements for authentication to another computing device, such as a self-service kiosk, a preferred layout or arrangement for data provided, and the like.

Based on the generated user prediction, a customized user experience output may be generated. The customized user experience output may include one or more user interfaces, animations, video streams, or the like. The customized user experience output may be transmitted to a computing device (e.g., self-service kiosk, user computing device, or the like) for display to the user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to dynamic customized experience generation and control. As discussed above, improving communication protocols may enable more efficient exchange of information to provide more customized experiences to users.

As discussed more fully herein, 5G technologies may be leveraged to provide enhanced, real-time services for users. Introduction of 5G technologies is expected to significantly improve data throughput of wireless systems. One or more of computer systems, communication devices, and networked devices described herein may utilize 5G technologies for transmission and reception of data. The use of 5G technologies may ensure secure transmission of data from multiple devices (e.g., entity devices, user devices, and the like) with lower probability of network congestion.

Aspects described herein are directed to leveraging 5G technologies to enhance a user experience provided to a user via one or more computing devices, such as a self-service kiosk, or the like. Based on a detected location of a user device and user data associated with the user of the user device, machine learning may be used to generate a user prediction. The user prediction may include user preferences for how information is presented, the types of functionality made available to the user, authentication processes or requirements, and the like.

Based on the generated user prediction, one or more customized user experience outputs may be generated. The customized user experience outputs may include one or more interactive user interfaces that may be configured to present data, receive user input, and the like. In some arrangements, the customized user experience outputs may include video streams, animations, and the like.

These and various other arrangements will be discussed more fully below.

Figure 1A:
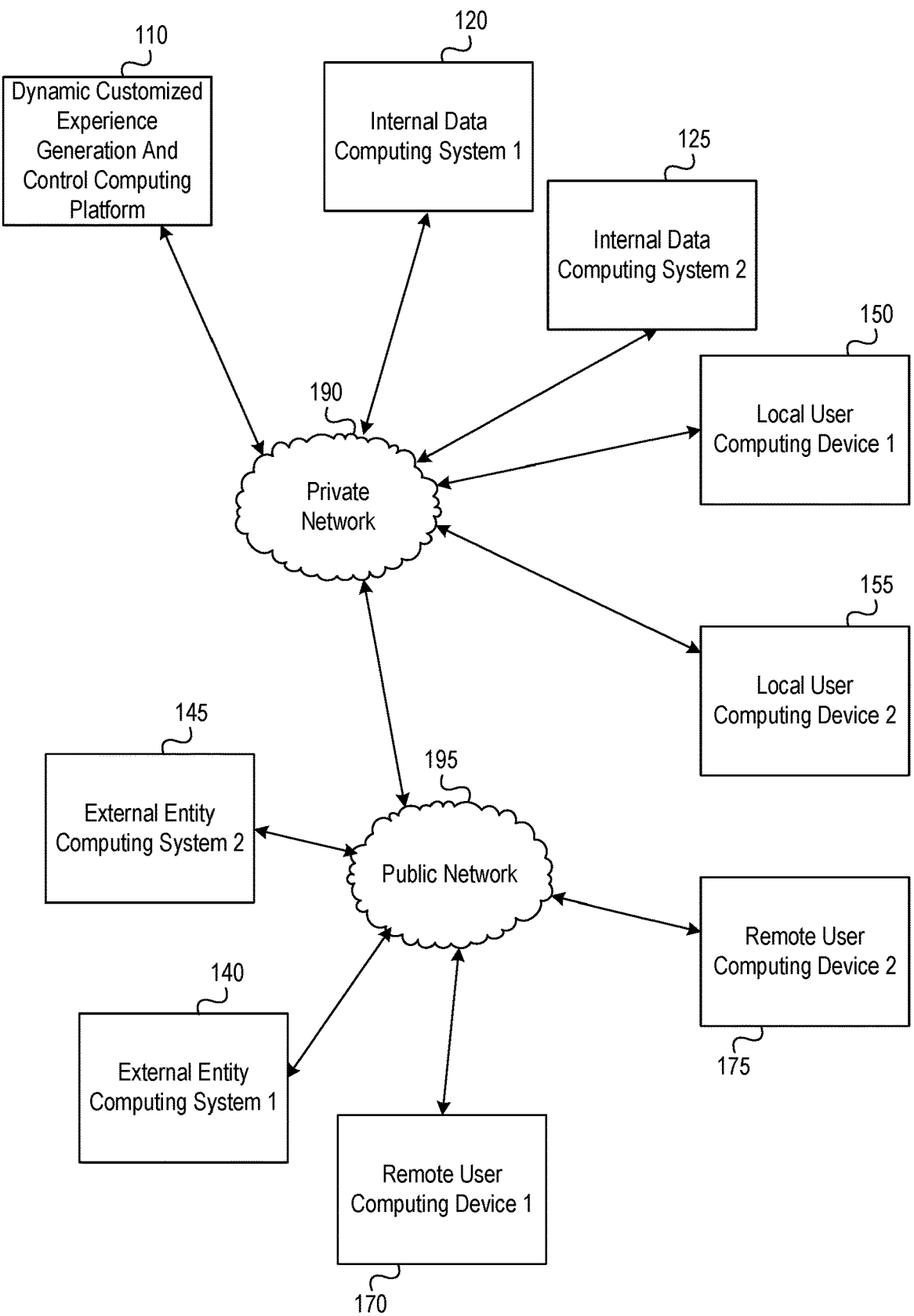
FIGS. 1A and 1B depict an illustrative computing environment for implementing dynamic customized experience generation and control functions in accordance with one or more aspects described herein.
Figure 1B:
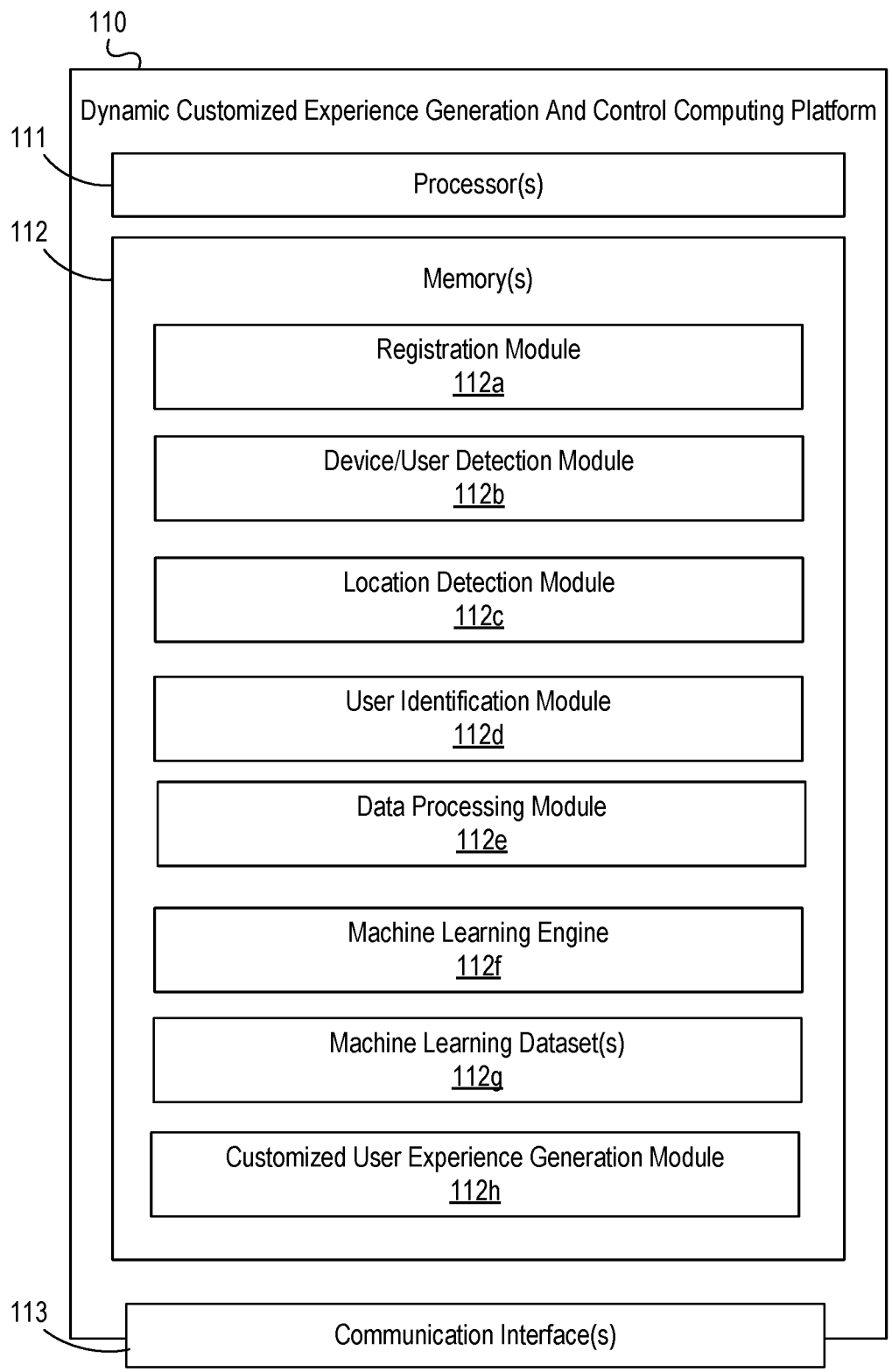

FIGS. 1A and 1B depict an illustrative computing environment for implementing and using a system for dynamic customized experience generation and control in accordance with one or more aspects described herein. Referring to FIG. 1A, computing environment 100 may include one or more computing devices and/or other computing systems. For example, computing environment 100 may include dynamic customized experience generation and control computing platform 110, a first internal data computing system 120, a second internal data computing system 125, a first external entity computing system 140, a second external entity computing system 145, a first local user computing device 150, a second local user computing device 155, a first remote user computing device 170, and a second remote user computing device 175. Although two internal data computing systems and external entity computing systems are shown in FIG. 1A, more or fewer computing systems may be used without departing from the invention.

Dynamic customized experience generation and control computing platform 110 may be configured to provide intelligent, dynamic generation and control of a customized end user experience. In some examples, the dynamic customized experience generation and control computing platform 110 may scan (in some examples, continuously scan) an area to detect one or more user devices. For instance, the dynamic customized experience generation and control computing platform 110 may scan for WiFi, Bluetooth, or other signals emitted from a mobile device. Based on the detected signal, the dynamic customized experience generation and control computing platform 110 may identify a user associated with the device, a location of the device (and, accordingly, the associated user) and may generate a customized user experience for the identified user.

In some examples, generating a customized user experience may include generating one or more user interfaces to be displayed to a user via an automated teller machine (ATM) or other self-service kiosk. For instance, machine learning may be used to evaluate data associated with the user (e.g., internal data associated with accounts, transactions, purchase history, and the like and/or external data including browsing history, recent location data, purchase data, and the like). The analyzed data may then be used to predict a likely action or desired feature for the user and one or more user interfaces including the likely action or desired feature may be generated and provided to the user. In some examples, the generated user interfaces may include video streams including interactive service providers (e.g., via a self-service kiosk) that may receive and process natural language to interact with the user.

In some examples, generating the customized user experience may include authenticating a user (e.g., to an ATM, mobile device application, online application or the like). In some examples, the generated customized experience may include requesting particular data (e.g., rotating types of data) to authenticate a user (e.g., facial recognition, biometric data, response to challenge question, or the like). Additionally or alternatively, a user may be automatically authenticated to a device or system based on detection of the user near a particular device (e.g., detection of a device at a particular location that may, in some examples, be a frequently visited location of the user).

In still other examples, the detected location and identity of a user may be used to generate customized content for display on a particular device, such as a billboard near the location of the user. In some arrangements, the user's selections on an online or mobile application may be detected and one or more customized user interfaces may be displayed to the user based on the selections made via the online or mobile application.

External entity computing system 140 and external entity computing system 145 may be any suitable computing system for communicating with dynamic customized experience generation and control computing platform 110, capturing user data, storing and transmitting user data, and the like. For instance, external entity computing system 140 and external entity computing system 145 may include one or more desktop computers, laptop computers, servers, or the like. In some examples, external entity computing system 140 and external entity computing system 145 may be owned by, operated by and/or associated with an entity other than the entity implementing the dynamic customized experience generation and control computing platform 110. For instance, external entity computing system 140, external entity computing system 145, and the like, may be owned by, operated by and/or associated with a vendor, service provider, financial institution, Internet service provider, or the like, that may capture user data (e.g., with appropriate user permissions) and, with user permission, share the data. In some examples, one or more of external entity computing system 140 and external entity computing system 145 may be operated by the entity operating the dynamic customized experience generation and control computing platform 110.

Internal data computing system 120 and internal data computing system 125 may be computing systems associated with (e.g., operated by, owned by, or the like) the entity implementing the dynamic customized experience generation and control computing platform 110. Internal data computing system 120, internal data computing system 125, and the like, may include one or more desktop computers, laptop computers, servers, and the like. In some examples, internal data computing system 120 and/or internal data computing system 125 may store data associated with one or more customers or users of the entity implementing the dynamic customized experience generation and control computing platform 110. For instance, internal data computing system 120 and/or internal data computing system 125 may store data associated with one or more customers, such as user identifying data, mobile device data provided via a registration process, purchase history data, user contact data, user account data, user profile data, user behavior data, transaction data, and the like. The user data may be captured, stored, transmitted, analyzed and the like with permission of the user.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access one or more entity systems, functions or processes. In some examples, local user computing device 150, 155 may be used to access the dynamic customized experience generation and control computing platform 110 to control parameters of the system, update or execute rules, modify settings, display notifications, and the like. In some arrangements, local user computing device 150, 155 may include an ATM or other self-service kiosk, or other computing device in communication with dynamic customized experience generation and control computing platform 110 and enabled for displaying or otherwise providing a generated customized user experience to the user.

The remote user computing devices 170, 175 may be used to communicate with, for example, dynamic customized experience generation and control computing platform 110. For instance, remote user computing devices 170, 175 may include user computing devices, such as mobile devices including smartphones, tablets, laptop computers, and the like, that may enable or permit a user to communicate with dynamic customized experience generation and control computing platform 110 to input user preferences, display one or more customized user experience interfaces, facilitate a transaction or purchase, display notifications, display requests for user information, and the like.

In one or more arrangements, internal data computing system 120, internal data computing system 125, external entity computing system 140, external entity computing system 145, local user computing device 150, local user computing device 155, remote user computing device 170, and/or remote user computing device 175 may be any type of computing device or combination of devices configured to perform the particular functions described herein. For example, internal data computing system 120, internal data computing system 125, external entity computing system 140, external entity computing system 145, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of internal data computing system 120, internal data computing system 125, external entity computing system 140, external entity computing system 145, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include dynamic customized experience generation and control computing platform 110. As illustrated in greater detail below, dynamic customized experience generation and control computing platform 110 may include one or more computing devices configured to perform one or more of the functions described herein. For example, dynamic customized experience generation and control computing platform 110 may include one or more computers (e.g., laptop computers, desktop computers, servers, server blades, or the like).

As mentioned above, computing environment 100 also may include one or more networks, which may interconnect one or more of dynamic customized experience generation and control computing platform 110, internal data computing system 120, internal data computing system 125, external entity computing system 140, external entity computing system 145, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic customized experience generation and control computing platform 110, internal data computing system 120, internal data computing system 125, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect dynamic customized experience generation and control computing platform 110, internal data computing system 120, internal data computing system 125, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., dynamic customized experience generation and control computing platform 110, internal data computing system 120, internal data computing system 125, local user computing device 150, local user computing device 155) with one or more networks and/or computing devices that are not associated with the organization. For example, external entity computing system 140, external entity computing system 145, remote user computing device 170, remote user computing device 175, might not be associated with an organization that operates private network 190 (e.g., because external entity computing system 140, external entity computing system 145, remote user computing device 170, remote user computing device 175, may be owned, operated, and/or serviced by one or more entities different from the organization that operates private network 190, such as a second entity different from the entity, one or more customers of the organization, one or more employees of the organization, public or government entities, and/or vendors of the organization, rather than being owned and/or operated by the organization itself), and public network 195 may include one or more networks (e.g., the internet) that connect external entity computing system 140, external entity computing system 145, remote user computing device 170, remote user computing device 175, to private network 190 and/or one or more computing devices connected thereto (e.g., dynamic customized experience generation and control computing platform 110, internal data computing system 120, internal data computing system 125, local user computing device 150, local user computing device 155).

Referring to FIG. 1B, dynamic customized experience generation and control computing platform 110 may include one or more processors 111, memory 112, and communication interface 113. A data bus may interconnect processor(s) 111, memory 112, and communication interface 113. Communication interface 113 may be a network interface configured to support communication between dynamic customized experience generation and control computing platform 110 and one or more networks (e.g., private network 190, public network 195, or the like). Memory 112 may include one or more program modules having instructions that when executed by processor(s) 111 cause dynamic customized experience generation and control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic customized experience generation and control computing platform 110 and/or by different computing devices that may form and/or otherwise make up dynamic customized experience generation and control computing platform 110.

For example, memory 112 may have, store and/or include a registration module 112a. Registration module 112a may store instructions and/or data that may cause or enable the dynamic customized experience generation and control computing platform 110 to receive registration information for one or more users. For instance, individual users may register with the system and provide user information, such as name, contact information, account information, mobile device information (e.g., phone number, international mobile equipment identity (IMEI) number, media access control (MAC) address, and the like. In some examples, a user may provide user preferences, or other predetermined rules for generating a customized user experience.

The registration data may be received by the registration module 112a and a registration record may be generated. The registration record may be generated in a data structure and adding the record may modify the data structure. The registration information may then be stored and may be used to generate a customized user experience, control one or more user experiences, display or otherwise provide the customized user experience, and the like.

Dynamic customized experience generation and control computing platform 110 may further have, store and/or include a device/user detection module 112b. Device/User detection module 112b may store instructions and/or data that may cause or enable the dynamic customized experience generation and control computing platform 110 to scan or otherwise search for a signal emitted from, for example, a computing device of a user such as a mobile device (e.g., remote user computing device 170, remote user computing device 175, or the like). In some examples, the signals emitted may include Bluetooth, WiFi, or other similar signals. Upon detecting a signal, a request for device or other data may be transmitted to the user device. In some examples, data associated with the detected signal may be used to identify the device, user, or the like (e.g., by comparing data to data stored during the registration process).

Dynamic customized experience generation and control computing platform 110 may further include location detection module 112c. Location detection module 112c may store instructions and/or data that may cause or enable the dynamic customized experience generation and control computing platform 110 to, based on the detected signal of the computing device, determine a location of the computing device. In some examples, determining the location of the computing device may be based on a detection of the device signal and a predetermined radius in which signals may be detected. For instance, if a signal may be detected from a device within a 10 meter radius, the location detection module 112c may determine that the computing device is within 10 meters of the device/user detection module 112b. In another example, a request for location data may be transmitted to the computing device upon detection of the device. Location response data may be received from the device and may include global positioning system (GPS) data captured by one or more sensors on the computing device.

Dynamic customized experience generation and control computing platform 110 may further have, store and/or include user identification module 112d. User identification module 112d may store instructions and/or data that may cause or enable the dynamic customized experience generation and control computing platform 110 to, based on data received from the computing device, identify a user associated with the computing device. For instance, data may be requested from the computing device, (e.g., IMEI, MAC, or the like) and this information may be compared to pre-stored data associated with a plurality of users to identify a user associated with the computing device.

Dynamic customized experience generation and control computing platform 110 may further have, store and/or include a data processing module 112e. Data processing module 112e may store instructions and/or data that may cause or enable the dynamic customized experience generation and control computing platform 110 to receive data from one or more data sources (e.g., internal data computing system 120, internal data computing system 125, external entity computing system 140, external entity computing system 145, or the like). The data may be received from the one or more sources and may be processed (e.g., filtered, formatted, or the like) for further processing using machine learning. The data received may be associated with the identified user and may include historical data, behavior data, and the like.

Dynamic customized experience generation and control computing platform 110 may have, store and/or include a machine learning engine 112f and machine learning datasets 112g. Machine learning engine 112f and machine learning datasets 112g may store instructions and/or data that may cause or enable dynamic customized experience generation and control computing platform 110 to receive user data and location data and generate one or more customized user experience outputs for the user. For instance, machine learning engine 112f may identify patterns in the location of the user, user data, or the like, to predict desired services, user interface layouts, authentication options, or the like, that may be desirable to the user. The machine learning datasets 112g may be generated based on analyzed data (e.g., data from previously received data, historical data, and the like), raw data, and/or received from one or more outside sources.

The machine learning engine 112f may receive data related to one or more users, and the like, and, using one or more machine learning algorithms, may generate one or more machine learning datasets 112g. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112f may analyze data to identify patterns of activity, sequences of activity, and the like, to generate one or more machine learning datasets 112g.

Based on the generated machine learning datasets 112g, customized user experience generation module 112h may store instructions and/or data that may cause or enable the dynamic customized experience generation and control computing platform 110 to generate one or more customized user experiences. For instance, one or more user interface, interactive animations, preferred layout, authentication options, enabled options, or the like, may be generated by the customized user experience generation module 112h and transmitted and/or displayed to the user (e.g., via a computing device in communication with dynamic customized experience generation and control computing platform 110, such as an ATM or self-service kiosk, via the computing device of the user, or the like).

FIGS. 2A-2H depict one example illustrative event sequence for implementing and using dynamic customized experience generation and control functions in accordance with one or more aspects described herein. The events shown in the illustrative event sequence are merely one example sequence and additional events may be added, or events may be omitted, without departing from the invention. In some examples, one or more aspects described with respect to FIGS. 2A-2H may be performed in real-time and/or using 5G technologies.

Figure 2A:
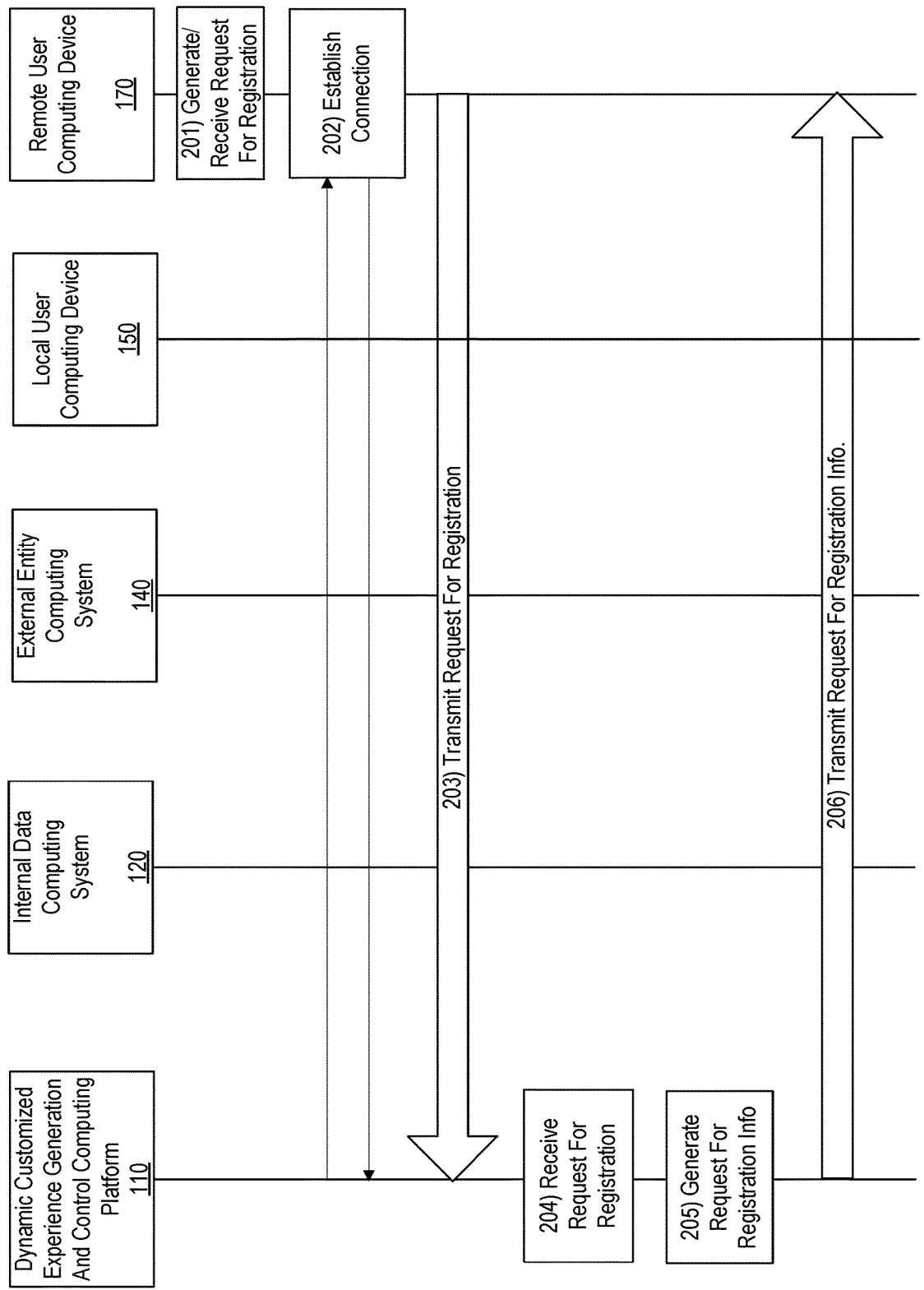
FIGS. 2A-2H depict an illustrative event sequence for implementing dynamic customized experience generation and control functions in accordance with one or more aspects described herein.

Referring to FIG. 2A, at step 201, a request for registration may be received and/or generated by a user computing device, such as remote user computing device 170. As discussed herein, in some examples, remote user computing device 170 may be a mobile computing device (e.g., smartphone, tablet, or the like) of the user.

At step 202, a connection may be established between the remote user computing device 170 and the dynamic customized experience generation and control computing platform 110. For instance, a first wireless connection may be established between the remote user computing device 170 and the dynamic customized experience generation and control computing platform 110. Upon establishing the first wireless connection, a communication session may be initiated between the remote user computing device 170 and the dynamic experience generation and control computing platform 110.

At step 203, the request for registration may be transmitted from the remote user computing device 170 to the dynamic customized experience generation and control computing platform 110. For instance, the request for registration may be transmitted during the communication session initiated upon establishing the first wireless connection.

At step 204, the request for registration may be received by the dynamic customized experience generation and control computing platform 110. At step 205, responsive to receiving the request for registration, a request for registration information may be generated. For example, one or more requests for data, user input, or the like, may be generated.

At step 206, the request for registration information may be transmitted from the dynamic customized experience generation and control computing platform 110 to the remote user computing device 170. In some examples, the request for registration information may be transmitted during the communication session initiated upon establishing the first wireless connection.

Figure 2B:
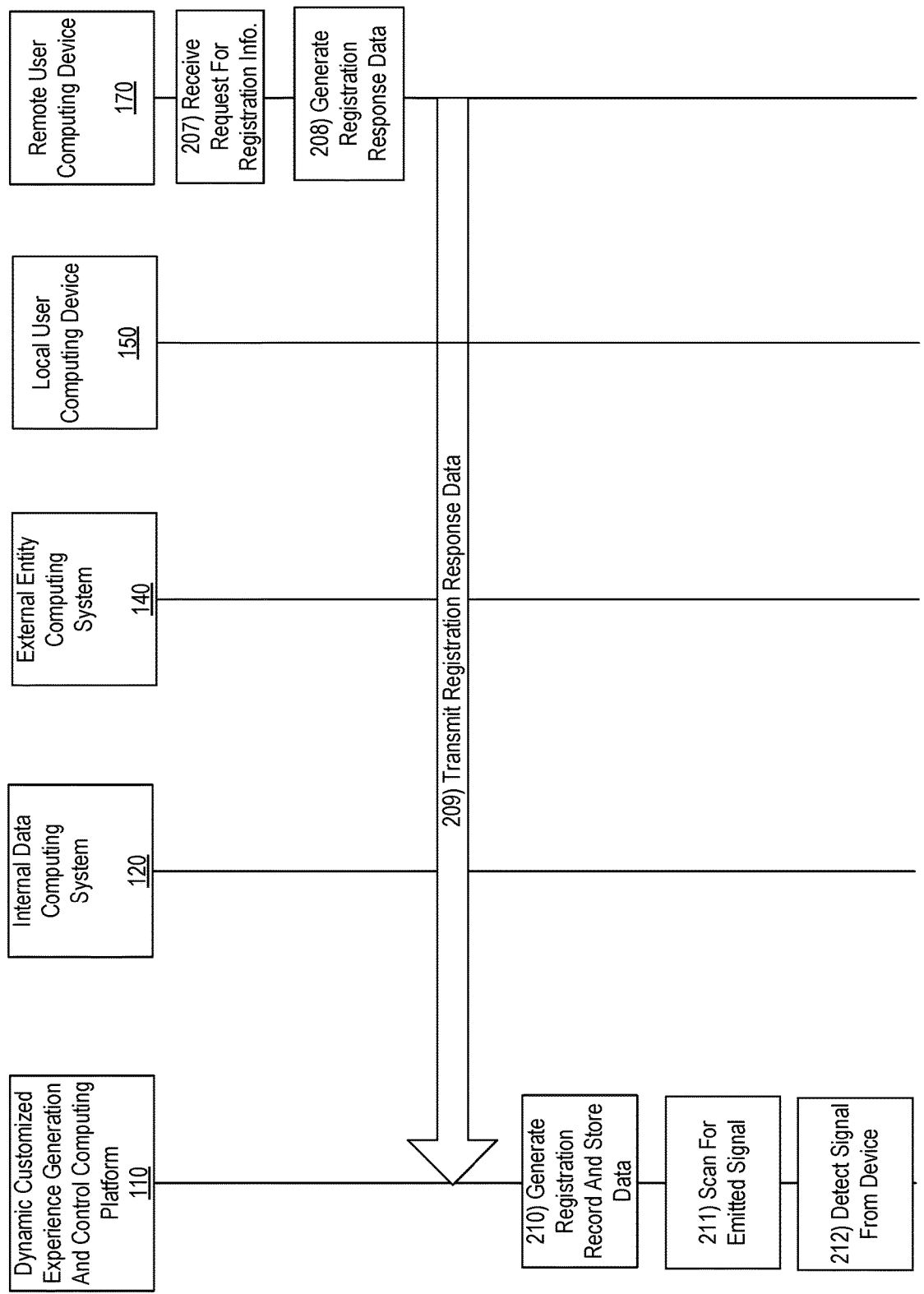

With reference to FIG. 2B, at step 207, the request for registration information may be received by the remote user computing device 170. At step 208, the request may be executed and registration response data may be generated. The registration response data may be generated based on received user input, data extracted from one or more devices or data storage locations, or the like.

In some examples, registration response data may include user data associated with one or more users or customers of an entity implementing the dynamic customized experience generation and control computing platform 110. For instance, users may join or elect to receive customized user experiences and may provide information, permissions, and the like. In some examples, registration response data may include user identifying data, user account data, user device data (e.g., identifying information such as IMEI, MAC address, and the like), user preferences, user permissions, and the like.

At step 209, the registration response data may be transmitted from the remote user computing device 170 to the dynamic customized experience generation and control computing platform 110. In some examples, the registration response data may be transmitted during the communication session initiated upon establishing the first wireless connection.

At step 210, a registration record may be generated and the registration response data may be stored in the registration record. For instance, a database may be modified to include add a registration record and the registration response data may be stored in that registration record in the database.

At step 211, the dynamic customized experience generation and control computing platform 110 may scan for signals emitted from one or more computing devices, such as remote user computing device 170. For instance, the dynamic customized experience generation and control computing platform 110 may scan (e.g., continuously) for signals emitted from one or more devices. In some examples, scanning for signals may include communicating with one or more other computing devices located at various locations to scan for emitted signals.

At step 212, a signal emitted from a computing device may be detected. For instance, a signal emitted from remote user computing device 170 may be detected by the dynamic customized experience generation and control computing platform 110 (and/or other computing device scanning for signals and in communication with the dynamic customized experience generation and control computing platform 110). In some examples, detecting the emitted signal may include analyzing the signal to determine whether it corresponds to a device which has been registered with the system (e.g., having data stored in a registration record).

Figure 2C:
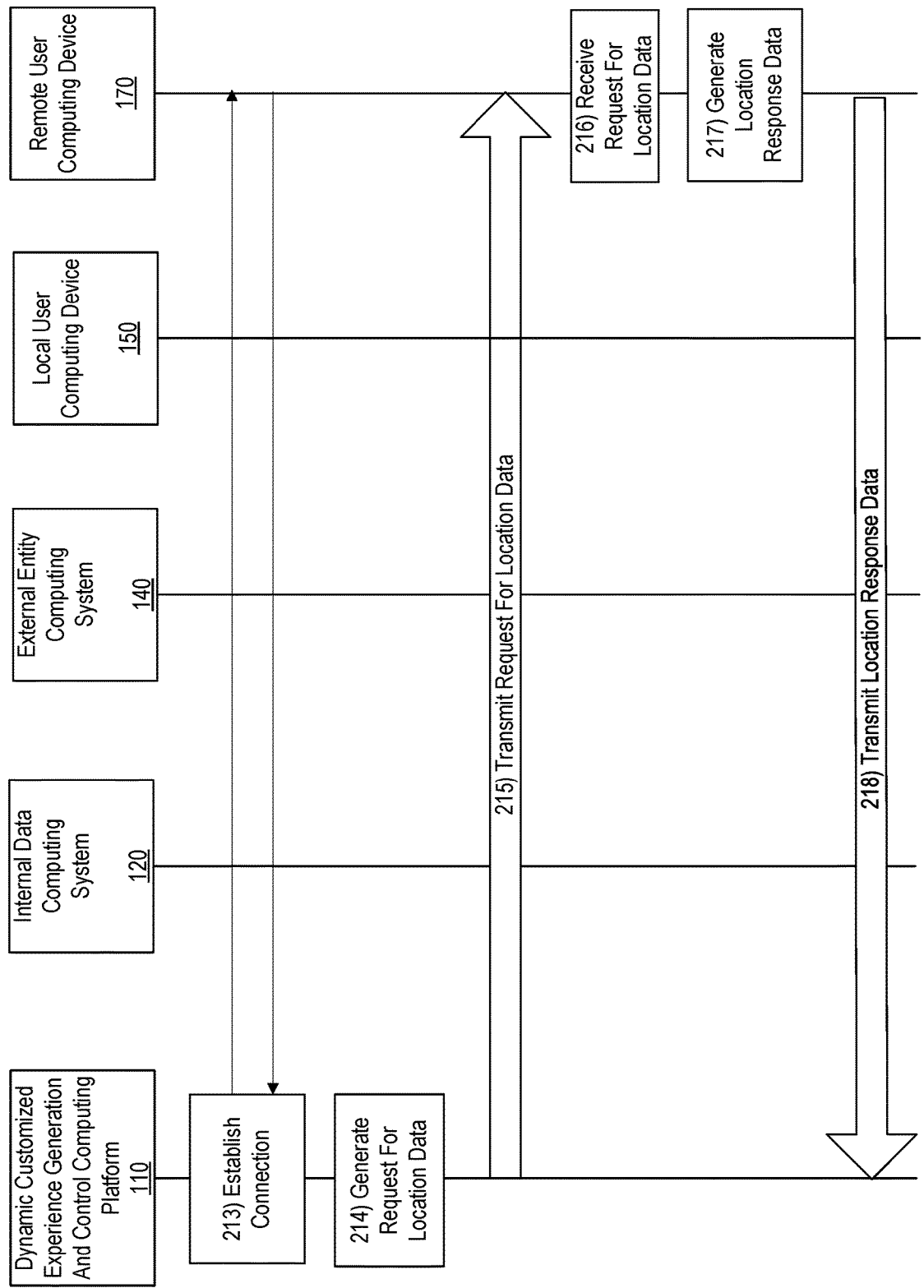

With reference to FIG. 2C, at step 213, in response to detecting the signal emitted from the remote user computing device 170, a connection may be established between the remote user computing device 170 and the dynamic customized experience generation and control computing platform 110. For instance, a second wireless connection may be established between the remote user computing device 170 and the dynamic customized experience generation and control computing platform 110. Upon establishing the second wireless connection, a communication session may be initiated between the remote user computing device 170 and the dynamic experience generation and control computing platform 110.

At step 214, a request for location data may be generated by the dynamic customized experience generation and control computing platform 110. For instance, the request for location data may include a request for current location data captured via global positioning system and/or one or more other sensors associated with the remote user computing device 170.

At step 215, the request for location data may be transmitted to the remote user computing device 170. For instance, the request for location data may be transmitted during the communication session initiated upon establishing the second wireless connection.

At step 216, the request for location data may be received by the remote user computing device 170 and processed. In some examples, processing the request may include capturing or extracted previously captured location data that was captured within a previous predefined period of time. For instance, in some examples, processing the request for location data may include the remote user computing device 170 identifying previously captured location data, extracting a time stamp from the previously captured location data, comparing the time stamp to a current time to determine whether the location data was captured within a predetermined threshold period of time prior to the current time (e.g., 3 seconds, 30 seconds, 1 minute, or the like) and, if so, using that location data. If not, the remote user computing device 170 may execute a sequence to capture current location data.

Based on the currently captured location data or previously captured location data within the threshold, location response data may be generated at step 217. The location response data may include coordinates (e.g., longitude and latitude) of the current location of the user. In another example, the location response data may include address data associated with the current location of the user.

At step 218, the location response data may be transmitted from the remote user computing device 170 to the dynamic customized experience generation and control computing platform 110.

Figure 2D:
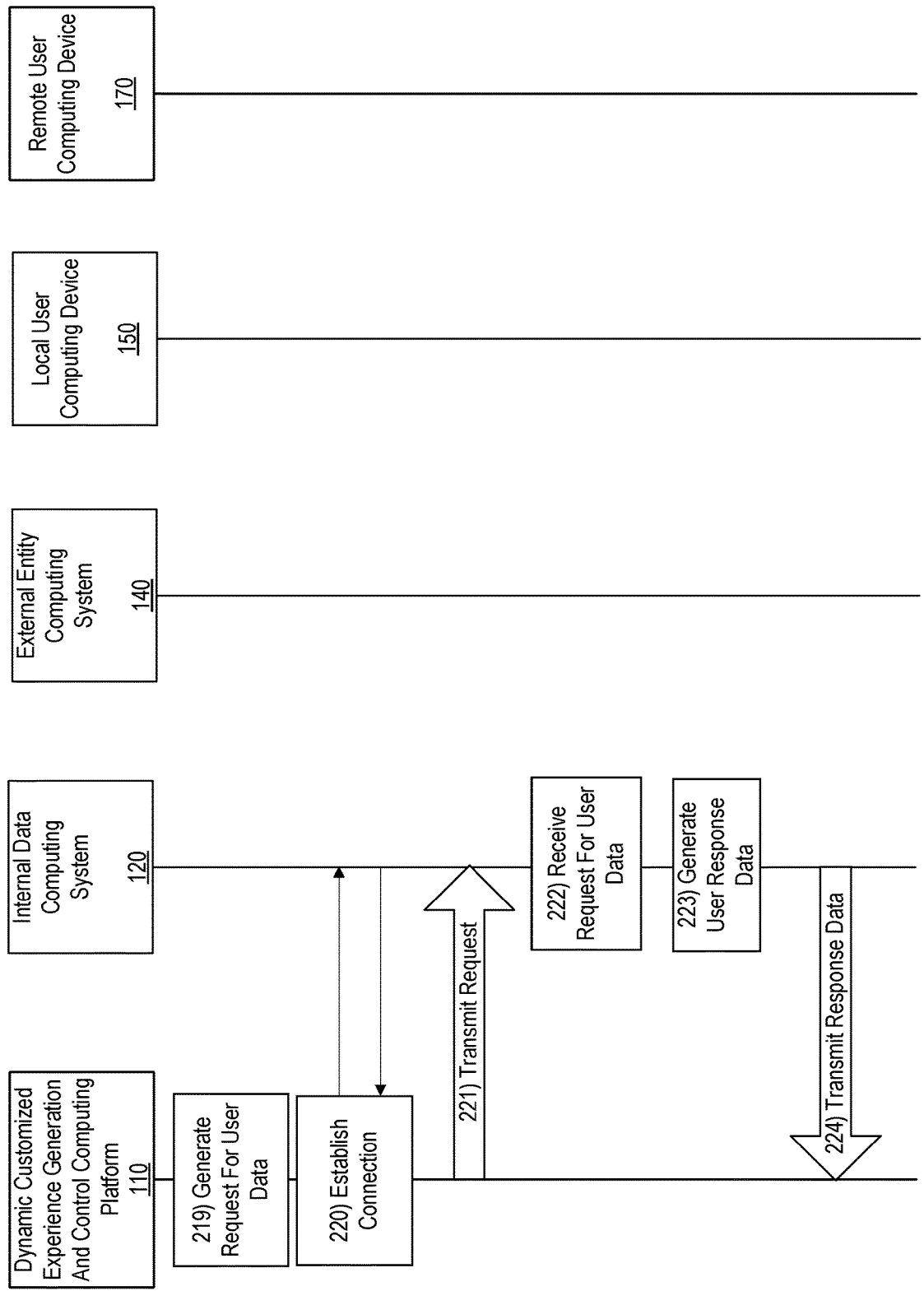

With reference to FIG. 2D, one or more requests for user data may be generated by the dynamic customized experience generation and control computing platform 110. For instance, a request for internal user data associated with a user of the remote user computing device 170 may be generated and/or a request for external user data associated with the user of the remote user computing device 170 may be generated. In some examples, a user may be identified based on the detected signal emitted from the remote user computing device 170 and a request for data associated with that user (e.g., account information, user preferences and permissions, recent transactions, purchase history, and the like) may be generated.

At step 220, a connection may be established between the dynamic customized experience generation and control computing platform 110 and internal data computing system 120. For instance, a third wireless connection may be established between the dynamic customized experience generation and control computing platform 110 and the internal data computing system 120. Upon establishing the third wireless connection, a communication session may be initiated between the internal data computing system 120 and the dynamic experience generation and control computing platform 110.

At step 221, the generated request for user data may be transmitted from the dynamic customized experience generation and control computing platform 110 to the internal data computing system 120. At step 222, the request for user data may be receive by the internal data computing system 120 and processed. Processing the request for user data may include extracting user identifying information from the request, using the user identifying information as input in a query to extract the requested user data from one or more databases or other data storage devices.

At step 223, user response data may be generated based on the user information extracted. At step 224, the user response data may be transmitted from the internal data computing system 120 to the dynamic customized experience generation and control computing platform 110. In some examples, the user response data may be transmitted during the communication session initiated upon establishing the third wireless connection.

Figure 2E:
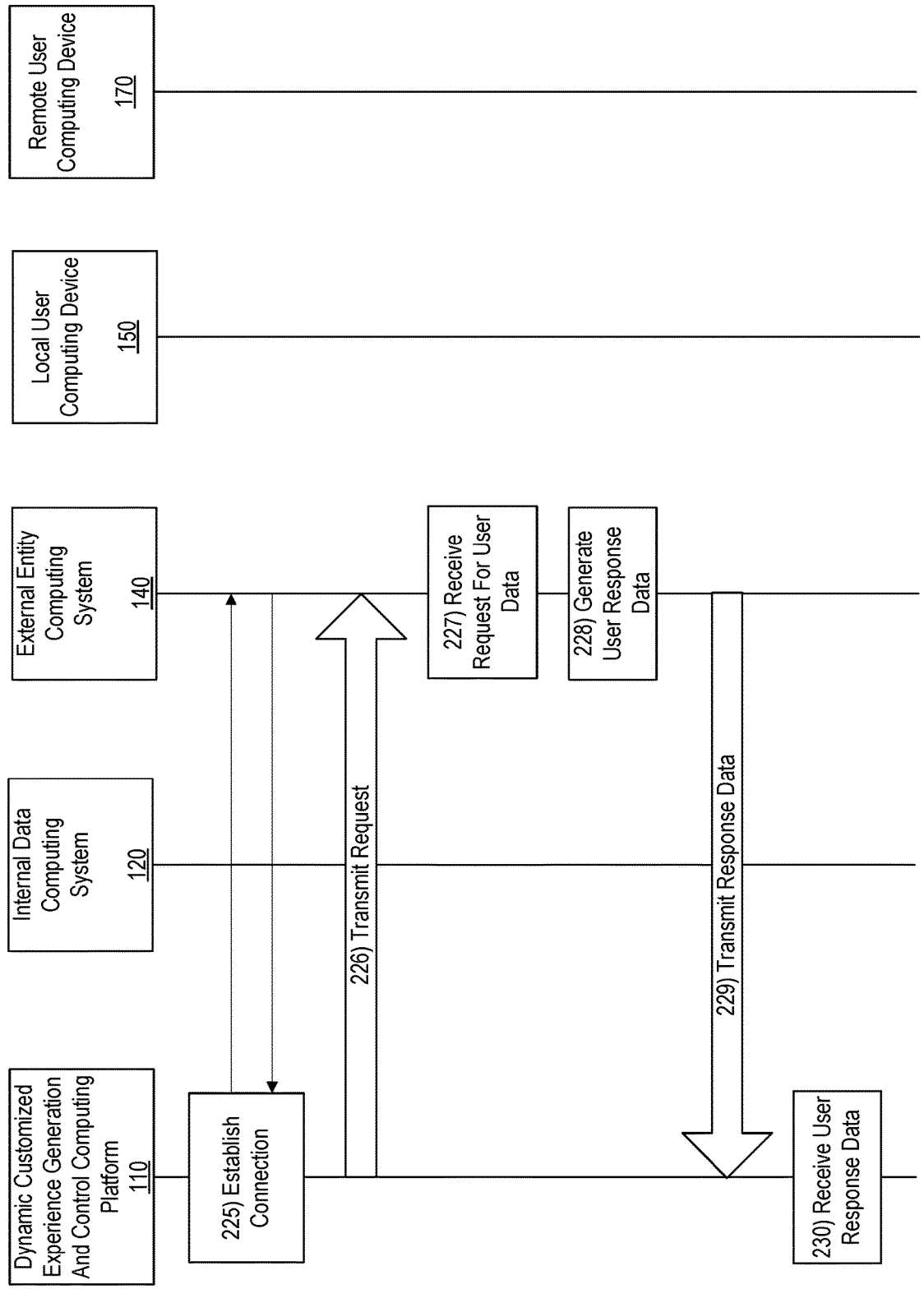

With reference to FIG. 2E, at step 225, a connection may be established between the dynamic customized experience generation and control computing platform 110 and external entity computing system 140. For instance, a fourth wireless connection may be established between the dynamic customized experience generation and control computing platform 110 and the external entity computing system 140. Upon establishing the fourth wireless connection, a communication session may be initiated between the external entity computing system 140 and the dynamic experience generation and control computing platform 110.

At step 226, the generated request for user data may be transmitted from the dynamic customized experience generation and control computing platform 110 to the external entity computing system 140. At step 227, the request for user data may be receive by the external entity computing system 140 and processed. Processing the request for user data may include extracting user identifying information from the request, using the user identifying information as input in a query to extract the requested user data from one or more databases or other data storage devices.

At step 228, user response data may be generated based on the user information extracted. At step 229, the user response data may be transmitted from the external entity computing system 140 to the dynamic customized experience generation and control computing platform 110. In some examples, the user response data may be transmitted during the communication session initiated upon establishing the fourth wireless connection.

At step 230, the user response data may be received by the dynamic customized experience generation and control computing platform 110. For instance, user response data may be received from internal data computing system 120 and/or external entity computing system 140.

Figure 2F:
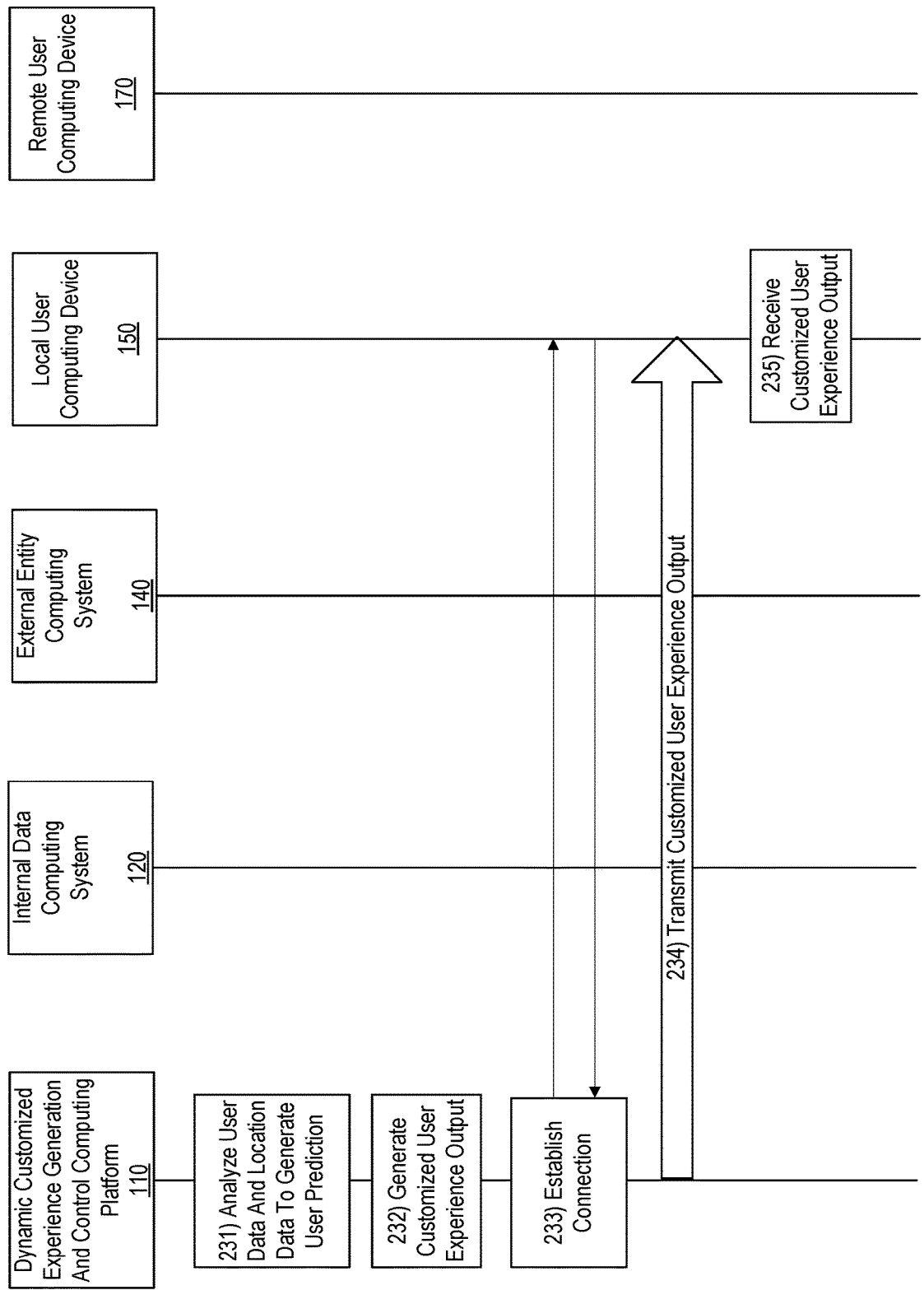

With reference to FIG. 2F, at step 231, the received user response data and location data may be analyzed to generate a user prediction. For instance, a user prediction may include a particular feature, service or option to provide to the user. In another example, the user prediction may include a method of presenting information to a user (e.g., using icons, in a list, via video stream, via animated assistant, or the like). In some examples, as discussed herein, machine learning may be used to analyze the received user response data and location data and/or to generate the user prediction.

At step 232, a customized user experience output may be generated based on the generated user prediction. For instance, one or more customized user interfaces, video sequences, animations, or the like, may be generated based on the generated user prediction and analyzed user response data and location data. The customized user experience output may include particular features or options for selection by a user based on the current location of the user (e.g., at a particular branch of an entity, at a particular ATM or self-service kiosk, or the like). Additionally or alternatively, the customized user experience output may include a particular presentation of data (e.g., layout, order of options, use of video, or the like) based on the location, analyzed user data, and the like. In some examples, the customized user experience output may include one or more authentication preferences, processes (e.g., two-factor authentication, authentication via particular data, or the like), or the like.

At step 233, a connection may be established between the dynamic customized experience generation and control computing platform 110 and local user computing device 150. In some examples, local user computing device 150 may be an ATM or other self-service kiosk, an associated computing device in a branch location at or near a location of the user, or the like. A fifth wireless connection may be established between the dynamic customized experience generation and control computing platform 110 and the local user computing device 150. Upon establishing the fifth wireless connection, a communication session may be initiated between the local user computing device 150 and the dynamic experience generation and control computing platform 110.

At step 234, the customized user experience output may be transmitted from the dynamic customized experience generation and control computing platform 110 to the local user computing device. In some examples, the customized user experience output may be transmitted during the communication session initiated upon establishing the fifth wireless connection.

At step 235, the customized user experience output may be received by the local user computing device 150 and may be displayed or otherwise provided to the user via a display of the local user computing device 150. For instance, if local user computing device 150 is an ATM, the customized user experience output may authenticate the user using one or more pre-stored preferences (e.g., no authentication if remote user computing device 170 is detected, card and personal identification number (PIN), biometric data, responses to series of challenge questions, or the like). Additionally or alternatively, the customized user experience output may include customized options available to a user, a pre-selected default option for the user, a particular layout for the user interface presented to the user, or the like.

Figure 2G:
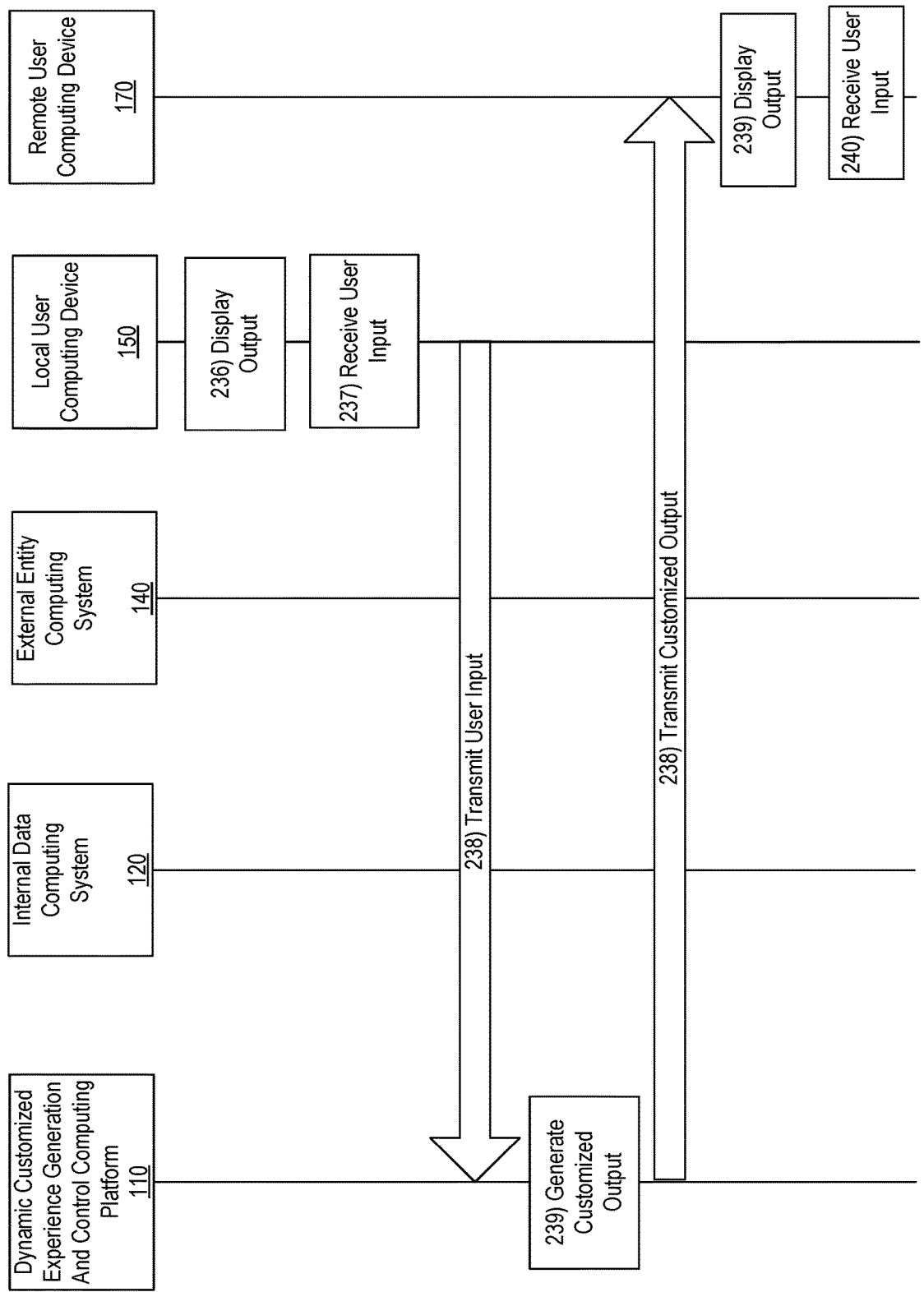

With reference to FIG. 2G, at step 236, the customized user experience output may be displayed by a display of the local user computing device 150.

At step 237, user input may be received by the local user computing device 150 in response to the displayed customized user experience output. The user input may include selection of an option, request for additional options or modifications, or the like.

At step 238, the received user input may be transmitted from the local user computing device 150 to the dynamic experience generation and control computing platform 110.

At step 239, a second customized output may be generated. In some examples, the second customized output may include a notification of the customized output transmitted to the local user computing device 150. In another example, the second customized output may include a request for authentication information. In still other examples, the second customized output may include additional options available to the user, an alternative presentation of the customized user experience output transmitted to the local user computing device 150, or the like.

At step 239, the second customized output may be displayed by a display of the remote user computing device 170 and, at step 240, user input may be received by the remote user computing device. The user input may include acknowledgment of the second customized output, request for additional options or other modification, or the like.

Figure 2H:
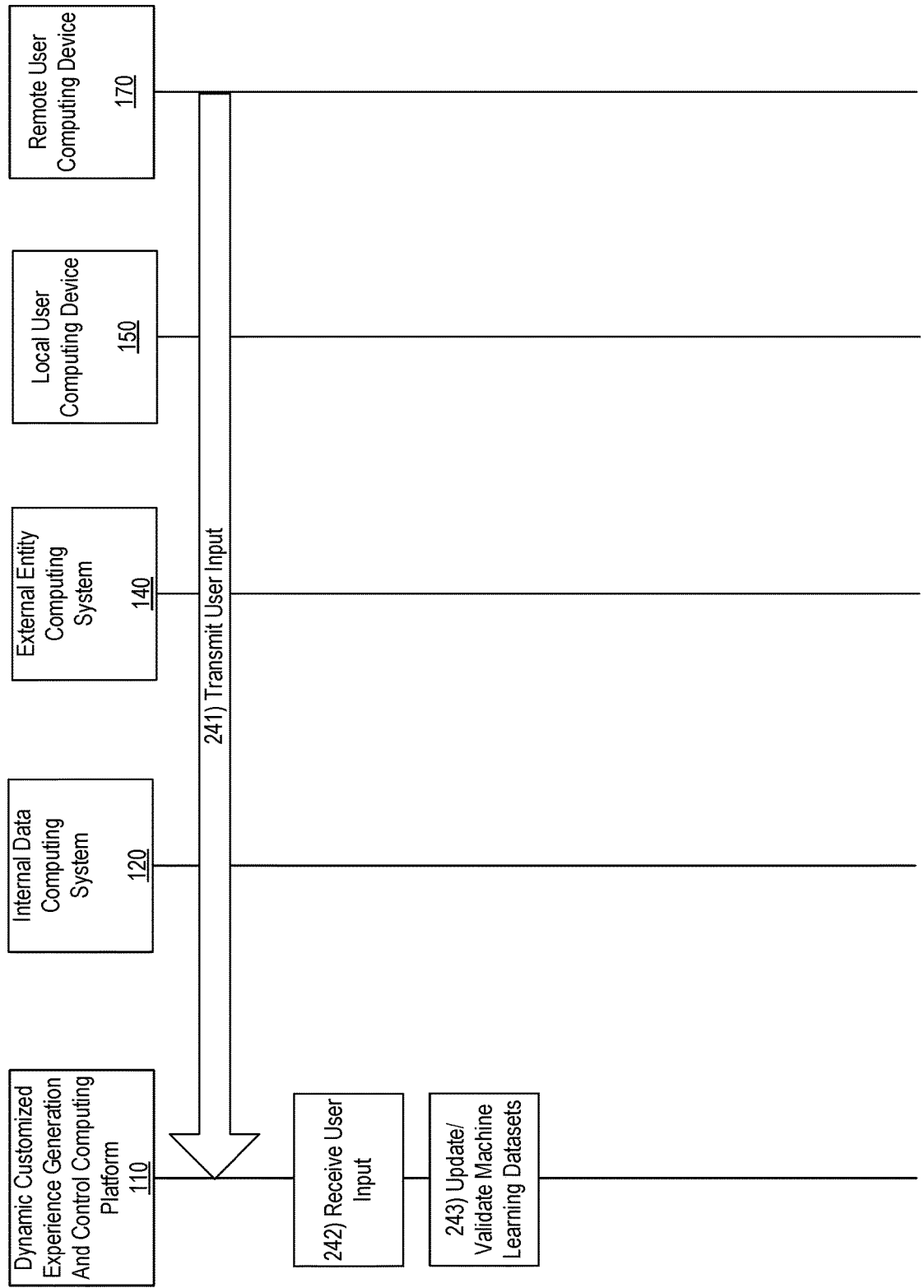

With reference to FIG. 2H, at step 241, the received user input may be transmitted from the remote user computing device 170 to the dynamic customized experience generation and control computing platform 110. At step 242, the user input received by the local user computing device 150 and/or the remote user computing device 170 may be received by the dynamic customized experience generation and control computing platform 110 and processed. Processing the received user input may include executing one or more selections or requests, processing events or transmitting signals or instructions to devices to process requested events, and the like. Based on the processed user input, the one or more machine learning datasets may be updated and/or validated in order to continuously improve the quality and accuracy of user predictions and customized outputs.

Figure 3:
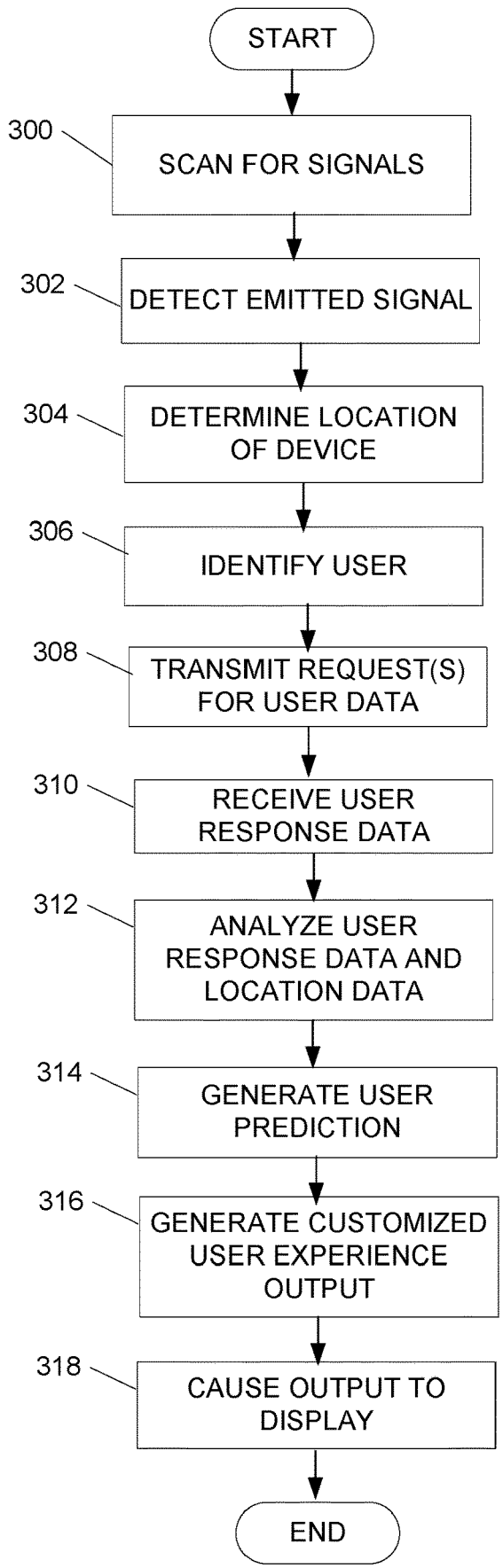
FIG. 3 depicts an illustrative method for implementing and using dynamic customized experience generation and control functions according to one or more aspects described herein.

FIG. 3 is a flow chart illustrating one example method of multicomputer signal processing to dynamically generate customized output and control functions according to one or more aspects described herein. The processes illustrated in FIG. 3 are merely some example processes and functions. The steps shown may be performed in the order shown, in a different order, more steps may be added, or one or more steps may be omitted, without departing from the invention.

In some examples, one or more aspects described with respect to FIG. 3 may be performed in real-time and/or using 5G technologies.

At step 300, a system, such as dynamic customized experience generation and control computing platform 110 may scan for one or more signals being emitted from one or more devices. For instance, the dynamic customized experience generation and control computing platform 110 (either itself or via one or more devices in communication therewith or connected thereto) may continuously scan to detect computing devices in various locations. In some examples, scanning may be performed in locations near a branch location of an entity implementing the dynamic customized experience generation and control computing platform 110. Additionally or alternatively, the scanning may be performed at or near a location of a self-service kiosk, such as an ATM. The scanning may be performed to detect users in an area or location in order to generate and provide a customized user experience for the user.

At step 302, a signal emitted from a computing device may be detected by the dynamic customized experience generation and control computing platform 110. For instance, a WiFi, Bluetooth, or other signal emitted by a computing device may be detected via the scanning. In some examples, upon detection of the signal, data received via the signal may be compared to pre-stored data to determine whether the computing device emitting the signal is registered with the dynamic customized experience generation and control computing platform 110.

At step 304, a location of the computing device may be determined. For instance, the emitted signal may be detected by a particular device at a particular location which may then identify a location of the computing device (e.g., by being within a predefined range of the detecting device). Additionally or alternatively, the dynamic customized experience generation and control computing platform 110 may transmit a request for location data to the computing device and location response data may be received by the dynamic customized experience generation and control computing platform 110. As discussed herein, the location data may be captured by GPS or other sensor within the computing device and may be captured upon receiving the request for location data or may be captured prior to receiving the request.

At step 306, a user associated with the computing device may be identified. For instance, the dynamic customized experience generation and control computing platform 110 may transmit a request to the computing device for information identifying the computing device which may then be used to identify a user registered with the dynamic customized experience generation and control computing platform 110. Additionally or alternatively, the detected signal may include device identifying (e.g., MAC address, IMEI, or the like) or user identifying data that may be used to identify the user (e.g., based on the user being registered with the dynamic customized experience generation and control computing platform 110 and with permission of the user). In still other examples, the location response data may include data identifying the device that may be used to then identify the user.

Based on the identified user, one or more requests for user data may be generated and transmitted to one or more computing systems at step 308. The requests for user data may be transmitted to one or more computing systems storing internal data of the user (e.g., data stored by an entity implementing the dynamic customized experience generation and control computing platform 110) and/or external data (e.g., data stored by an entity other than the entity implementing dynamic customized experience generation and control computing platform 110 and accessible with permission of the user, publicly available or the like).

In response to the transmitted requests, user response data may be received by the dynamic customized experience generation and control computing platform 110 at step 310. At step 312, the user response data and received location data may be analyzed using machine learning. Based on the analysis, a user prediction may be generated at step 314. The user prediction may include a particular format or layout for data or options to be provided to the user (e.g., at an ATM or self-service kiosk, via an associate computing device at a branch location, or the like), particular selectable options or functionality provided to the user (e.g., functions may be enabled/disabled, options may be provided or deleted, or the like), data that may be provided in a video stream and related to interests of expected requests of the user, authentication arrangements or requirements, or the like.

At step 316, a customized user experience output may be generated. In some examples, the customized user experience output may include one or more customized user interfaces including the predicted layout, functions, options, or the like, from the user prediction. Additionally or alternatively, the customized user experience output may include a generated video stream or animation that includes information that might be of interest to the user. Further, the customized user experience output may include one or more authentication arrangements that may be executed (e.g., automatic authentication of the user upon detection of the device, requirement for particular types of authenticating information, requirement for particular types of authenticating information to be provided in a particular order to authenticate, or the like).

At step 318, the dynamic customized experience generation and control computing platform 110 may cause the generated customized user experience output to be display on a display of a device. For instance, the dynamic customized experience generation and control computing platform 110 may transmit the generated customized user experience output to a second computing device (e.g., ATM, self-service kiosk, associate computing device, or the like) and may cause the generated customized user experience output to be displayed on the second computing device. The user may then provide input via the second computing device which may then be used to execute or process requested events for the user, may be transmitted to the dynamic customized experience generation and control computing platform 110 to update and/or validate machine learning datasets, and the like.

Figure 4:
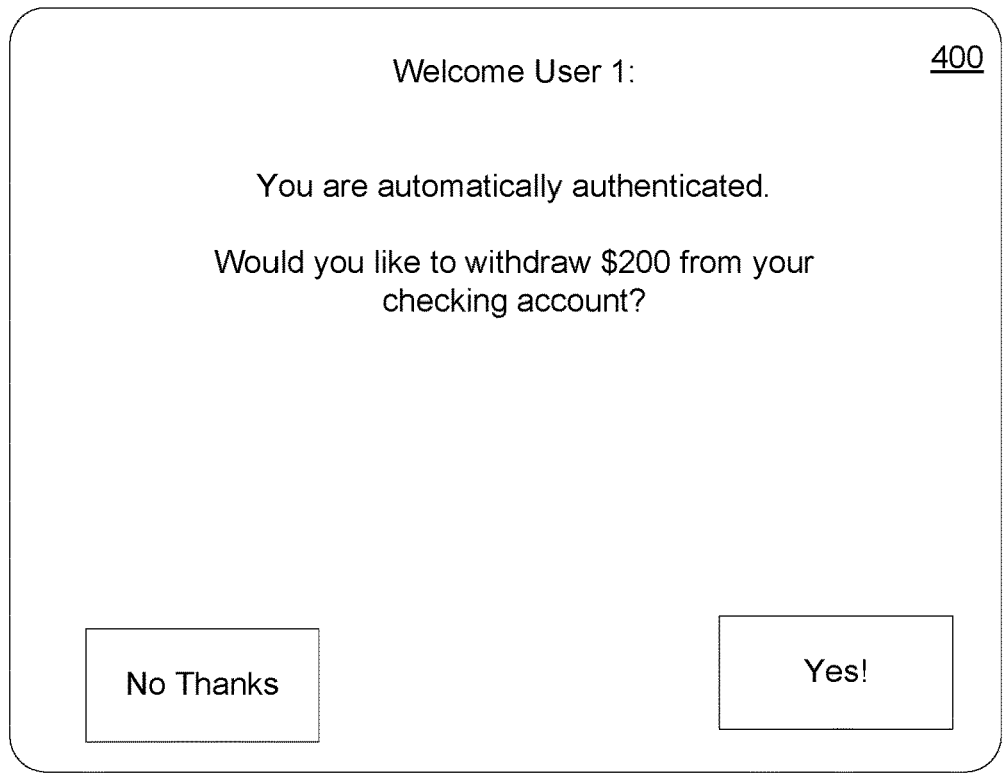
FIG. 4 illustrates one example customized output for use with dynamic customized experience generation and control functions according to one or more aspects described herein.

FIG. 4 illustrates one example customized user experience output that may be provided to a user. The customized user experience output includes a user interface 400 that may be customized based on a generated user prediction, as discussed herein. For instance, the user prediction may include particular authentication requirements (e.g., automatic authentication as shown in FIG. 4) as well as a default function provided to a user (e.g., withdraw $200 from checking as shown in FIG. 4). This user interface may be customized for a particular user (e.g., user 1) based on the received location data and user response data, as discussed above.

Figure 5:
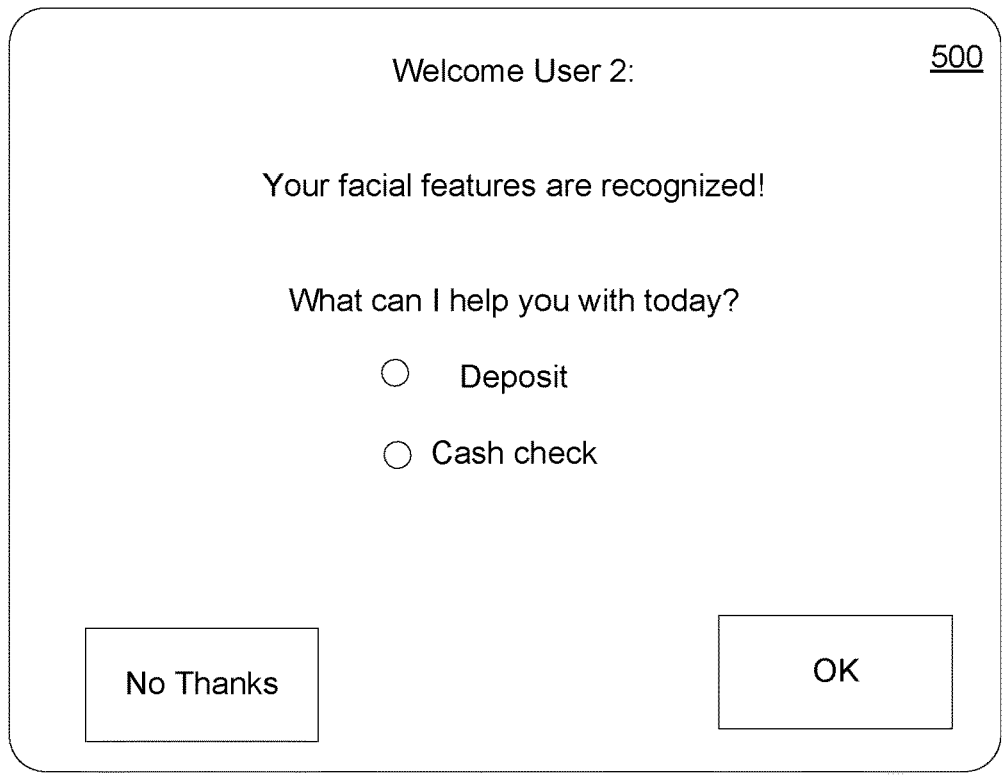
FIG. 5 illustrates another example customized output for use with dynamic customized experience generation and control functions according to one or more aspects described herein.

FIG. 5 illustrates another example customized user experience output that may be provided to a different user (e.g., user 2). The customized user experience output includes a user interface 500 that is generated based on user predictions and includes particular authentication requirements (e.g., facial recognition) and a customized list of functions available for selection (e.g., deposit, cash check).

The customized user experience outputs shown in FIGS. 4 and 5 are merely some example outputs that may be generated based on example user predictions. Various other outputs based on other user predictions may be generated without departing from the invention.

Aspects described herein are directed to leveraging 5G technologies to provide, in real-time, enhanced, customized user experiences. Accordingly, transmission or receipt of data described with respect to the arrangements discussed herein (e.g., in the event sequence of FIGS. 2A-2H, the flow chart of FIG. 3, or the like) may be performed using 5G communication standards over, for example, one or more wireless networks.

5G standards allow a higher throughput than prior wireless cellular technologies that use $4^{th}$ generation (4G) standards, $3^{rd}$ generation (3G) standards, and the like. A higher throughput may allow a larger number of wireless devices to maintain communication over a wireless network. The use of 5G communication standards to maintain connections with communication devices may allow for efficient processing of location data, user data, generation of user predictions, transmission of generated customized user experience outputs, and the like.

As discussed herein, 5G standards and technology may be used to efficiently, and in real-time, scan for signals emitted from a user computing device to detect a user computing device at a particular location or near a particular location. Detecting a user computing device at a particular location may prompt the system to receive user information related to a user associated with the user computing device, process the data using machine learning, generate user predictions and generate user experience outputs. In some examples, one or more aspects described herein may be performed in real-time to enable efficient generation of predictions, customized experiences, and the like.

In some examples, machine learning may be used to map user data, location data and the like, to particular user predictions. For instance, user historical data may indicate that a user withdraws $150 from a particular ATM each Friday. Accordingly, upon detecting the mobile device of the user at the ATM on a Friday, the system may automatically generate an option to withdraw $150 and present that to the user as the initial user interface and option for selection. Accordingly, the user might not have to input multiple selections to access the desired functionality.

In other examples, the arrangements described herein may be used to generate customized user experiences that may be presented via a publicly visible computing device. For instance, based on location data obtained from a user computing device and associated user data, a user prediction including information that might be of interest to the user may be generated and may be presented via, for example, an electronic billboard. In some examples, the information provided might not include any information identifying the user. Rather, the billboard would display a customized user experience output that included information identified as likely to be of interest to the user. The display may be generated and provided in real-time in order to provide the information to the user in an efficient manner.

In still other examples, a user computing device may be detected in a branch location of an entity, such as a branch of a financial institution. Upon detecting the user as within the branch (e.g., based on location data from the user computing device) user data may be retrieved and analyzed to generate a user prediction related to services the user might be looking to obtain in their visit, user preferences for service, and the like. This information may be presented to an associate via a customized user experience output displayed on the computing device of the associate. In some arrangements, the user prediction may include an offer for goods or services in which the user might be interested.

As discussed herein, many arrangements described may be used with ATMs or other self-service kiosks. For instance, a user may have authentication preferences that may be executed upon detecting the user computing device at or near the location of the ATM. For instance, a user may prefer to use facial recognition rather than insert a card and input a PIN. Accordingly, upon detecting the user computing device at or near the location of the ATM, the ATM may execute functionality to require facial recognition scanning rather than card and PIN to authenticate a user. In another example, a user may desire to rely on detection of the user computing device and input of a PIN (e.g., without inserting a card) to authenticate. Upon detecting the user computing device at or near the ATM location, the ATM may enable authentication requirements to automatically request a PIN, rather than waiting for the user to insert a card. Various other authentication arrangements may be executed without departing from the invention.

In some examples, aspects described herein may be used in conjunction with a user interacting with an online or mobile application. The system may detect the user and automatically customize options, appearance, or the like, of information provided to the user via the application. In some examples, the system may detect an unfinished task (e.g., loan application, updated information request, or the like) and may prompt the user to complete the unfinished task.

As discussed herein, the arrangements described may analyze user data that is internal to the entity and external to the entity to generate user predictions. Accordingly, in one example, if a user is shopping for a home or car (e.g., based on web browsing history obtained with permission of the user), the system may detect a location of a mobile device of a user, compare the location to known vehicle lots or homes for sale, and generate a customized user experience output including the vehicle lots or homes for sale in the area. In some examples, additional information may also be provided along with the location (e.g., customer ratings, comparable previous sales, or the like).

In some examples, the customized user experience output may include a virtual agent. The virtual agent may be a video stream, animation, or the like, that may assist with various functionality. The virtual agent may be customized to user preferences, history, or the like.

In some arrangements, the system may detect a user leaving his or her home and may evaluate traffic patterns, or the like, to provide customized input for identifying a route.

As discussed herein, aspects described provide for real-time enhanced generation of customized user experiences. By leveraging 5G communications and using computing systems and machine learning to generate user predictions, customized user experiences can be transmitted to one or more devices and displayed to the user quickly and efficiently.

Figure 6:
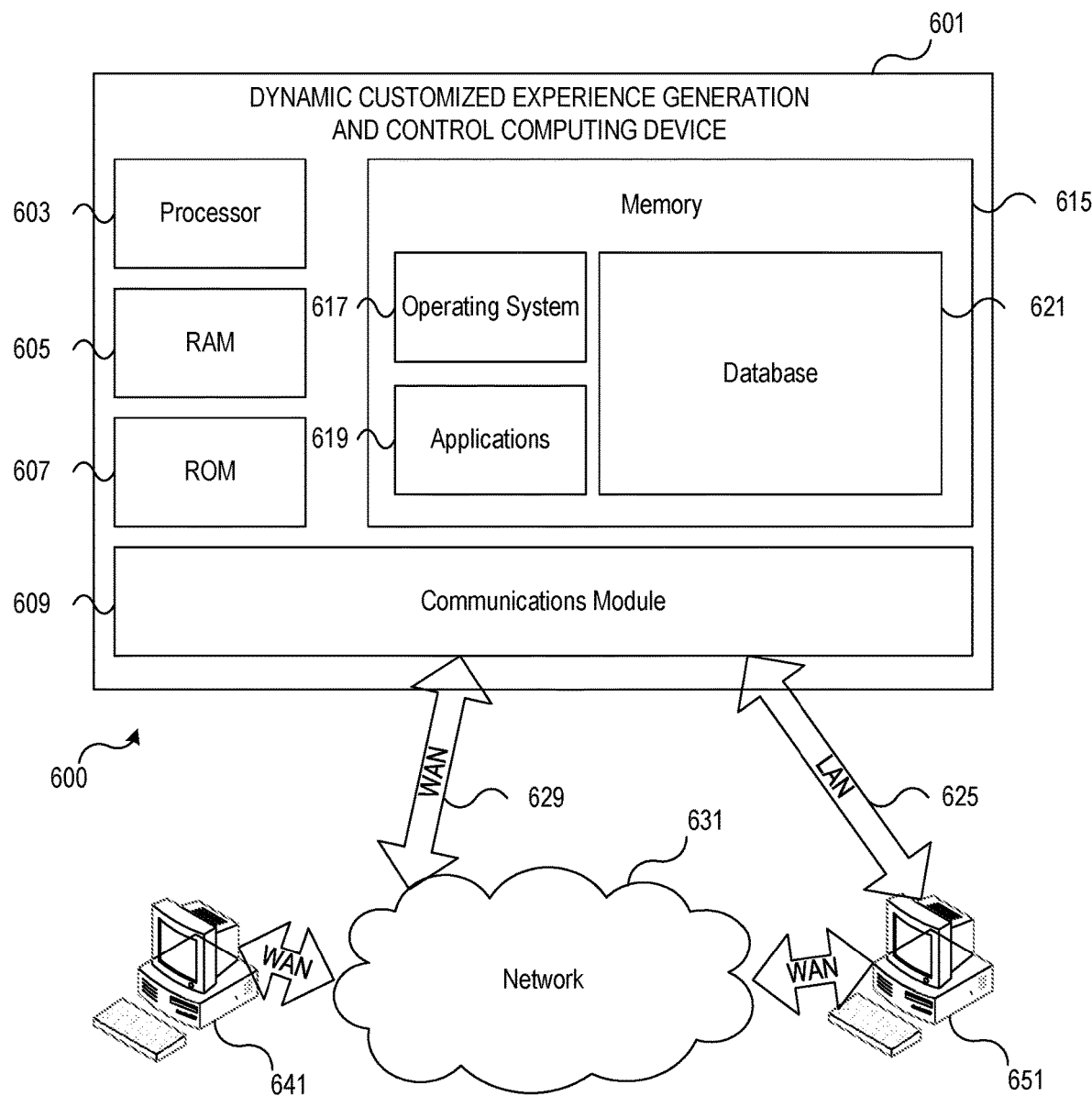
FIG. 6 illustrates one example operating environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include dynamic customized experience generation and control computing device 601 having processor 503 for controlling overall operation of dynamic customized experience generation and control computing device 601 and its associated components, including Random Access Memory (RAM) 605, Read-Only Memory (ROM) 607, communications module 609, and memory 615. Dynamic customized experience generation and control computing device 601 may include a variety of computer readable media. Computer readable media may be any available media that may be accessed by dynamic customized experience generation and control computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by dynamic customized experience generation and control computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic customized experience generation and control computing device 601. Such a processor may execute computer-executable instructions stored on a computer-readable medium.

Software may be stored within memory 615 and/or storage to provide instructions to processor 603 for enabling dynamic customized experience generation and control computing device 601 to perform various functions as discussed herein. For example, memory 615 may store software used by dynamic customized experience generation and control computing device 601, such as operating system 617, application programs 619, and associated database 621. Also, some or all of the computer executable instructions for dynamic customized experience generation and control computing device 601 may be embodied in hardware or firmware. Although not shown, RAM 605 may include one or more applications representing the application data stored in RAM 605 while dynamic customized experience generation and control computing device 601 is on and corresponding software applications (e.g., software tasks) are running on dynamic customized experience generation and control computing device 601.

Communications module 609 may include a microphone, keypad, touch screen, and/or stylus through which a user of dynamic customized experience generation and control computing device 601 may provide input, and may also include one or more of a speaker for providing audio output and a video display device for providing textual, audiovisual and/or graphical output. Computing system environment 600 may also include optical scanners (not shown).

Dynamic customized experience generation and control computing device 601 may operate in a networked environment supporting connections to one or more remote computing devices, such as computing devices 641 and 651. Computing devices 641 and 651 may be personal computing devices or servers that include any or all of the elements described above relative to dynamic customized experience generation and control computing device 601.

The network connections depicted in FIG. 6 may include Local Area Network (LAN) 625 and Wide Area Network (WAN) 629, as well as other networks. When used in a LAN networking environment, dynamic customized experience generation and control computing device 601 may be connected to LAN 625 through a network interface or adapter in communications module 609. When used in a WAN networking environment, dynamic customized experience generation and control computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 7:
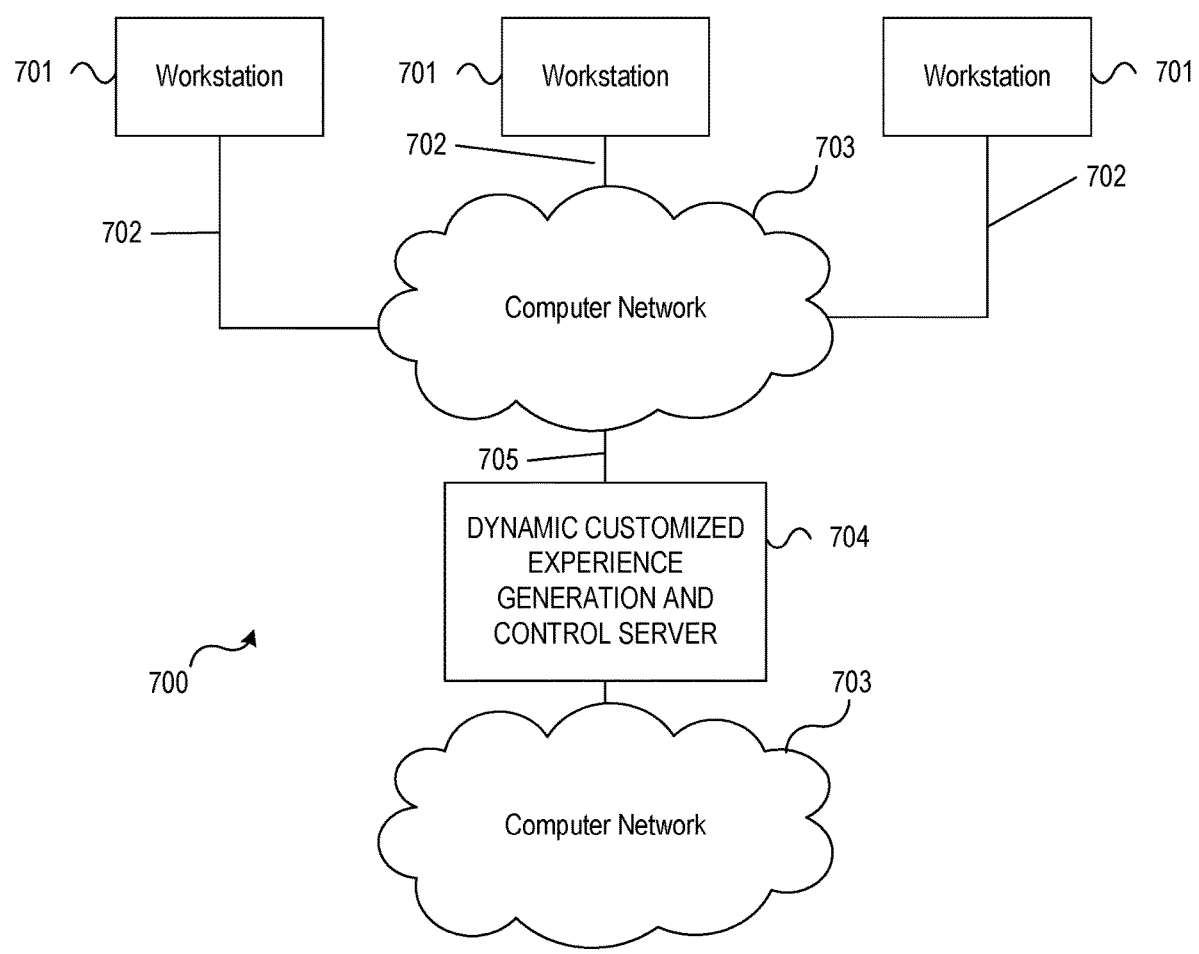
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to dynamic customized experience generation and control server 704. In system 700, dynamic customized experience generation and control server 704 may be a server, processor, computer, or data processing device, or combination of the same, configured to perform the functions and/or processes described herein. Server 704 may be used to generate requests for offers, evaluate offers received, generate counter offers, present offers to users, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and dynamic customized experience generation and control server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      continuously scan for signals emitted from one or more computing devices;
      detect a signal emitted from a first computing device;
      determine, responsive to the detecting, a location of the first computing device and a day of a week;
      identify, based on the detected signal, a user associated with the first computing device;
      transmit, to one or more computing systems, a request for user data associated with the identified user;
      receive, from the one or more computing systems, user response data;
      analyze, using machine learning, the user response data, the location, and the day of the week to generate a user prediction including a customized authentication requirement and customized options corresponding to services available for selection, the customized authentication requirement including a request for a particular type of data selected from a rotation of types of data and the customized options including at least one option corresponding to a service available for selection based on the day of the week and including a customized order of options provided for selection based at least in part on the location;
      generate, based on the user prediction, a customized user experience output for the user, the customized user experience including interactive animations; and
      display, to the user, the customized user experience output.

2. The computing platform of claim 1, wherein displaying the customized user experience output includes transmitting to a second computing device at the location of the first computing device, the generated customized user experience output and displaying the customized user experience output on a display of the second computing device.

3. The computing platform of claim 2, wherein the second computing device is a self-service kiosk.

4. The computing platform of claim 1, wherein detecting the location of the first computing device further includes:
   transmitting a request for location data to the first computing device; and
   receiving, from the first computing device, location data captured using one or more sensors of the first computing device.

5. The computing platform of claim 1, wherein the user prediction further includes: a customized layout of information.

6. The computing platform of claim 1, wherein the customized user experience output further includes at least one of: a customized user interface and a video stream.

7. A method, comprising:
   by a computing platform comprising at least one processor, memory, and a communication interface:
      continuously scanning for signals emitted from one or more computing devices;
      detecting, by the at least one processor, a signal emitted from a first computing device;
      determining, by the at least one processor and responsive to the detecting, a location of the first computing device and a day of a week;
      identifying, by the at least one processor and based on the detected signal, a user associated with the first computing device;
      transmitting, by the at least one processor and to one or more computing systems, a request for user data associated with the identified user;
      receiving, by the at least one processor and from the one or more computing systems, user response data;
      analyzing, by the at least one processor and using machine learning, the user response data, the location, and the day of the week to generate a user prediction including a customized authentication requirement and customized options corresponding to services available for selection, the customized authentication requirement including a request for a particular type of data selected from a rotation of types of data and the customized options including at least one option corresponding to a service available for selection based on the day of the week and including a customized order of options provided for selection based at least in part on the location;
      generating, by the at least one processor and based on the user prediction, a customized user experience output for the user, the customized user experience including interactive animations; and displaying, to the user, the customized user experience output.

8. The method of claim 7, wherein displaying the customized user experience output includes transmitting to a second computing device at the location of the first computing device, the generated customized user experience output and displaying the customized user experience output on a display of the second computing device.

9. The method of claim 8, wherein the second computing device is a self-service kiosk.

10. The method of claim 7, wherein the first computing device is a mobile device of the user.

11. The method of claim 7, wherein detecting the location of the first computing device further includes:
transmitting, by the at least one processor, a request for location data to the first computing device; and
receiving, by the at least one processor and from the first computing device, location data captured using one or more sensors of the first computing device.

12. The method of claim 7, wherein the user prediction further includes a customized layout of information.

13. The method of claim 7, wherein the customized user experience output further includes at least one of: a customized user interface and a video stream.

14. One or more non-transitory computer-readable media storing instructions that, when executed by a computing platform comprising at least one processor, memory, and a communication interface, cause the computing platform to:
continuously scan for signals emitted from one or more computing devices;
detect a signal emitted from a first computing device;
determine, responsive to the detecting, a location of the first computing device and a day of a week;
identify, based on the detected signal, a user associated with the first computing device;
transmit, to one or more computing systems, a request for user data associated with the identified user;
receive, from the one or more computing systems, user response data;
analyze, using machine learning, the user response data, the location, and the day of the week to generate a user prediction including a customized authentication requirement and customized options corresponding to services available for selection, the customized authentication requirement including a request for a particular type of data selected from a rotation of types of data and the customized options including at least one option corresponding to a service available for selection based on the day of the week and including a customized order of options provided for selection based at least in part on the location;
generate, based on the user prediction, a customized user experience output for the user, the customized user experience including interactive animations; and
display, to the user, the customized user experience output.

15. The one or more non-transitory computer-readable media of claim 14, wherein displaying the customized user experience output includes transmitting to a second computing device at the location of the first computing device, the generated customized user experience output and displaying the customized user experience output on a display of the second computing device.

16. The one or more non-transitory computer-readable media of claim 15, wherein the second computing device is a self-service kiosk.

17. The one or more non-transitory computer-readable media of claim 14, wherein the first computing device is a mobile device of the user.

18. The one or more non-transitory computer-readable media of claim 14, wherein detecting the location of the first computing device further includes:
transmitting a request for location data to the first computing device; and
receiving, from the first computing device, location data captured using one or more sensors of the first computing device.

19. The one or more non-transitory computer-readable media of claim 14, wherein the user prediction further includes a customized layout of information.

20. The one or more non-transitory computer-readable media of claim 14, wherein the customized user experience output further includes at least one of: a customized user interface and a video stream.

21. The computing platform of claim 1, wherein the customized authentication requirement further includes a requirement for more than one particular type of data selected from the rotation of types of data to be provided in a particular order.

* * * * *